(12) United States Patent
Vanderwalker et al.

(10) Patent No.: US 10,781,796 B2
(45) Date of Patent: Sep. 22, 2020

(54) CLAMPING APPARATUS FOR POSITIONING A MAIN BEARING OF A WIND TURBINE DURING AN INSTALLATION AND/OR REPAIR PROCEDURE

(71) Applicant: General Electric Company, Schenectady, NY (US)

(72) Inventors: Darrick Adam Vanderwalker, Pattersonville, NY (US); Kevin Tyler Eherts, Albany, NY (US)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 15/646,208

(22) Filed: Jul. 11, 2017

(65) Prior Publication Data

US 2019/0017552 A1 Jan. 17, 2019

(51) Int. Cl.
*F03D 80/50* (2016.01)
*F03D 13/10* (2016.01)
(Continued)

(52) U.S. Cl.
CPC .............. *F03D 80/50* (2016.05); *B23P 6/002* (2013.01); *F03D 13/10* (2016.05); *F03D 80/70* (2016.05);
(Continued)

(58) Field of Classification Search
CPC .............. F05B 2240/50; F05B 2240/54; F05B 2230/50; F05B 2230/604; F05B 2230/608; F05B 2230/80; F05B 2240/60; F03D 80/70; F03D 1/00; F03D 80/50; F03D 80/88; B23P 6/002; F16C 2360/31; F16C 35/078; F16C 35/06; F16C 35/063;
(Continued)

(56) References Cited

U.S. PATENT DOCUMENTS 8,500,400 B2 * 8/2013 Signore .................. B66C 1/108
416/1
2004/0026867 A1 * 2/2004 Adams .................. F16C 33/782
277/349
(Continued)

FOREIGN PATENT DOCUMENTS

DE 10 2005 061498 A1 7/2007
DE 102005061498 A1 * 7/2007 ............ F16C 35/062
(Continued)

OTHER PUBLICATIONS

Translation of DE-102005061498-A1 (Year: 2007).*
(Continued)

*Primary Examiner* — Matthew P Travers
(74) *Attorney, Agent, or Firm* — Dority & Manning, P.A.

(57) ABSTRACT

A clamping apparatus for positioning a main bearing of a wind turbine includes a push component arranged between a main flange of a main shaft of the wind turbine and a cover of the main bearing. Further, the clamping apparatus includes a spacer plate located within a gap between the cover and the main bearing. As such, the push component is configured to apply a force to the cover so as to push the spacer plate against the main bearing such that the main bearing is pushed into and secured in place.

19 Claims, 7 Drawing Sheets

(51) Int. Cl.
    *B23P 6/00*     (2006.01)
    *F16C 35/06*     (2006.01)
    *F03D 80/70*     (2016.01)
    *F03D 80/80*     (2016.01)
    *F16C 19/38*     (2006.01)

(52) U.S. Cl.
    CPC ............ *F16C 19/385* (2013.01); *F16C 35/06* (2013.01); *F03D 80/88* (2016.05); *F05B 2230/60* (2013.01); *F05B 2230/604* (2013.01); *F05B 2230/80* (2013.01); *F05B 2240/50* (2013.01); *F05B 2240/57* (2013.01); *F05B 2240/60* (2013.01); *F05B 2260/30* (2013.01); *F05B 2260/302* (2013.01); *F05B 2260/507* (2013.01); *F05B 2270/604* (2013.01); *F16C 2360/31* (2013.01)

(58) Field of Classification Search
    CPC ......... Y10T 29/49638; Y10T 29/49696; Y10T 29/49698; Y10T 29/49318; Y10T 29/53796; Y10T 29/5383; Y02E 10/722
    See application file for complete search history.

(56) References Cited

U.S. PATENT DOCUMENTS

| | | |
|---|---|---|
| 2004/0240104 A1 | 12/2004 | Francuski et al. |
| 2010/0098368 A1 | 4/2010 | van der Beek et al. |
| 2011/0162174 A1* | 7/2011 | Liesegang ............ F16C 35/063 24/457 |
| 2011/0162194 A1* | 7/2011 | Sugimoto ................. B66C 9/02 29/592.1 |
| 2011/0188988 A1 | 8/2011 | Wadehn |
| 2013/0195391 A1 | 8/2013 | Cornelio |
| 2015/0026979 A1* | 1/2015 | Muller .................... B25B 27/06 29/889.1 |
| 2015/0285224 A1* | 10/2015 | Hambrecht ........... F16C 19/522 415/1 |
| 2017/0122296 A1* | 5/2017 | Li .......................... F03D 80/70 |

FOREIGN PATENT DOCUMENTS

| | | | |
|---|---|---|---|
| EP | 2 233 760 A1 | 9/2010 | |
| EP | 2754893 A1 * | 7/2014 | ............ F03B 13/264 |
| WO | WO-2009042478 A1 * | 4/2009 | ............ F16C 19/386 |
| WO | 2010/035011 A2 | 4/2010 | |

OTHER PUBLICATIONS

U.S. Appl. No. 15/498,760, filed Apr. 27, 2017.
U.S. Appl. No. 15/498,778, filed Apr. 27, 2017.
U.S. Appl. No. 15/498,790, filed Apr. 27, 2017.
U.S. Appl. No. 15/498,655, filed Apr. 27, 2017.
U.S. Appl. No. 15/498,682, filed Apr. 27, 2017.
U.S. Appl. No. 15/498,704, filed Apr. 27, 2017.
U.S. Appl. No. 15/498,805, filed Apr. 27, 2017.
Extended European Search Report and Opinion issued in connection with corresponding EP Application No. 18181923.6 dated Dec. 10, 2018.

* cited by examiner

CLAMPING APPARATUS FOR POSITIONING A MAIN BEARING OF A WIND TURBINE DURING AN INSTALLATION AND/OR REPAIR PROCEDURE

FIELD

The present subject matter relates generally to wind turbines, and more particularly to a clamping apparatus for positioning and securing a main bearing of a wind turbine during an installation and/or repair procedure.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate member support frame located within the nacelle. More specifically, in many wind turbines, the gearbox is mounted to the bedplate member via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. The main shaft is coupled to an input shaft of the gearbox, which has a higher speed output shaft connected to the generator. Thus, the geared drivetrain aims to increase the velocity of the mechanical motion. Further, the gearbox and the generator are typically supported by one or more bearings and mounted to the bedplate member via one or more torque arms or supports.

Over time, the main shaft and associated bearings may become worn and/or damaged due to operating loads and forces from the wind acting on the wind turbine components. Unfortunately, repair of main shaft and the main bearings often requires the turbine head to be removed from atop the nacelle and transported to a manufacturing facility, which can be very time-consuming and labor intensive. In addition, when the main shaft must be replaced, the associated bearings must be reinstalled onto the new shaft.

Thus, the art is continuously seeking new and improved systems and methods for improving repair and/or replacement of the main shaft and the main bearing, particularly uptower. Accordingly, the present disclosure is directed to a clamping apparatus for securing a main bearing of a wind turbine during an installation and/or repair procedure and methods of using same.

BRIEF DESCRIPTION

Aspects and advantages of the invention will be set forth in part in the following description, or may be obvious from the description, or may be learned through practice of the invention.

In one aspect, the present disclosure is directed to a clamping apparatus for positioning a main bearing of a wind turbine. The main bearing may include a tapered roller bearing, a spherical roller bearing, a ball bearing, or any other suitable bearing type. Further, the clamping apparatus may include a push component arranged between a main flange of a main shaft of the wind turbine and a cover of the main bearing. Further, the clamping apparatus may include a spacer plate located within a gap between the cover and the main bearing. As such, the push component may be configured to apply a force to the cover so as to push the spacer plate against the main bearing such that the main bearing is pushed into and secured in place.

In one embodiment, the push component includes a push member at least partially enclosed within a housing. In certain embodiments, the push member may include a piston, a jacking fastener or screw, or any other suitable push member capable of applying the desired force to the cover of the main bearing.

In another embodiment, the spacer plate may include one or more locating features for locating the spacer plate within the gap. For example, in several embodiments, the locating features may include dowel pins, fasteners, studs, or similar. In additional embodiments, the spacer plate may include an arcuate shape corresponding to a profile of the main bearing.

In further embodiments, the spacer plate may include a recess configured to receive a portion of the cover of the main bearing. In another embodiment, the spacer plate further may include one or more securing features for securing the spacer plate within the gap. For example, the securing feature(s) may include magnets, set screws, or similar. In particular embodiments, the securing feature(s) may be arranged within the recess so as to secure the spacer plate to the cover of the main bearing.

In another aspect, the present disclosure is directed to a method for securing a main bearing of a wind turbine. The method includes installing a push component of a clamping apparatus between a main flange of a main shaft of the wind turbine and a cover of the main bearing. Further, the method may include installing a spacer plate of the clamping apparatus within a gap between the cover and the main bearing. The method also includes applying a force to the cover via the push component so as to push the spacer plate against the main bearing such that the main bearing is pushed into and secured in place. It should be understood that the method may further include any of the additional features and/or steps as described herein.

In yet another aspect, the present disclosure is directed to a drivetrain assembly for a wind turbine. The drivetrain assembly includes a main shaft having a main flange, a main bearing assembly having a main bearing and a cover, and a clamping apparatus for securing the main bearing. The main bearing includes an inner race, an outer race, and a plurality of roller elements configured therebetween. The clamping apparatus includes a push component positioned between the main flange and the cover and a spacer plate positioned within a gap between the cover and the main bearing. As such, the push component is configured to apply a force to the cover so as to push the spacer plate against the main bearing such that the main bearing is pushed into and secured in place. It should be understood that the drivetrain assembly may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
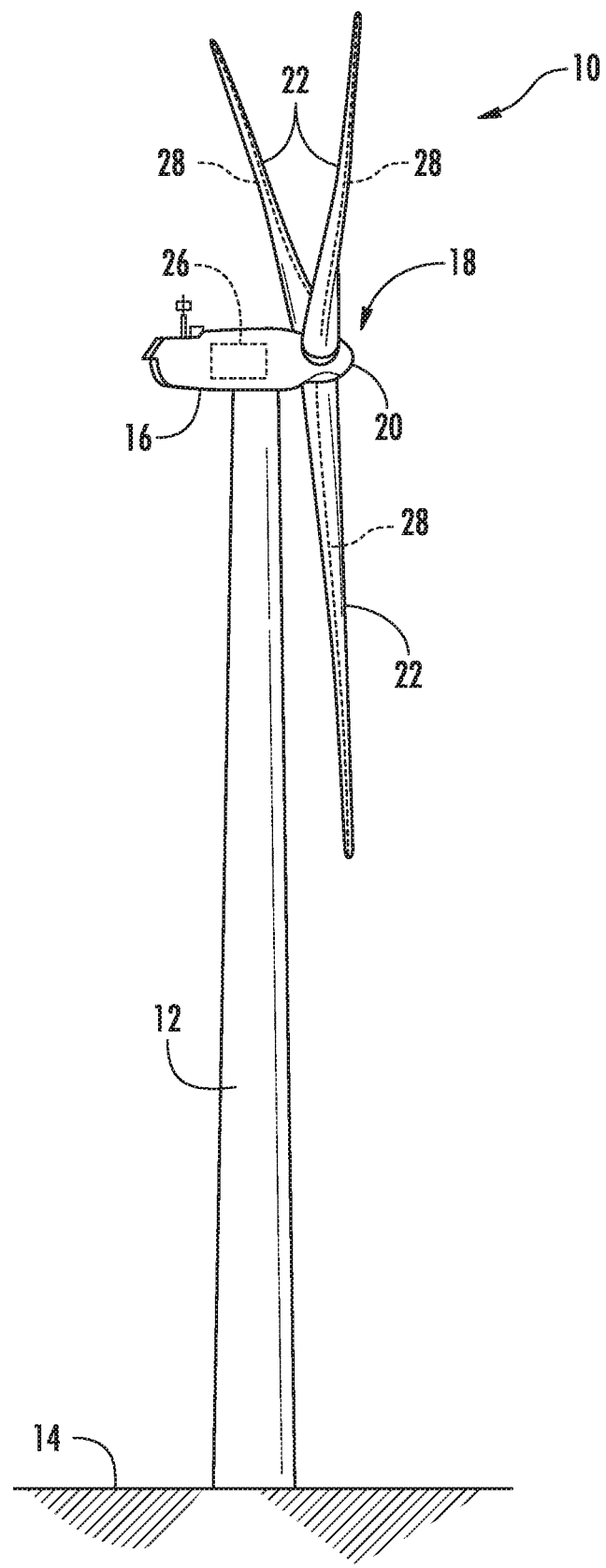
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a clamping apparatus for positioning a main bearing of a wind turbine. The clamping apparatus includes a push component arranged between a main flange of a main shaft of the wind turbine and a cover of the main bearing and a spacer plate located within a gap between the cover and the main bearing. Thus, the push component is configured to apply a force to the cover so as to push the spacer plate against the main bearing (e.g. the outer race of the main bearing) so as to maintain the main bearing in place during and installation and/or repair procedure.

Thus, the present disclosure provides many advantages not present in the prior art. For example, the system and method of the present disclosure provides easy alignment and accurate installation of a new or repaired main bearing. Further, the clamping apparatus described herein secures the main bearing such that repairs of the bearing or main shaft can be easily made uptower or downtower. As used herein, the term "uptower" is intended to be representative of any location of the wind turbine that is above a top portion of a wind turbine tower, for example, any location within or outside of the nacelle while the nacelle is coupled to the top portion of the wind turbine tower.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
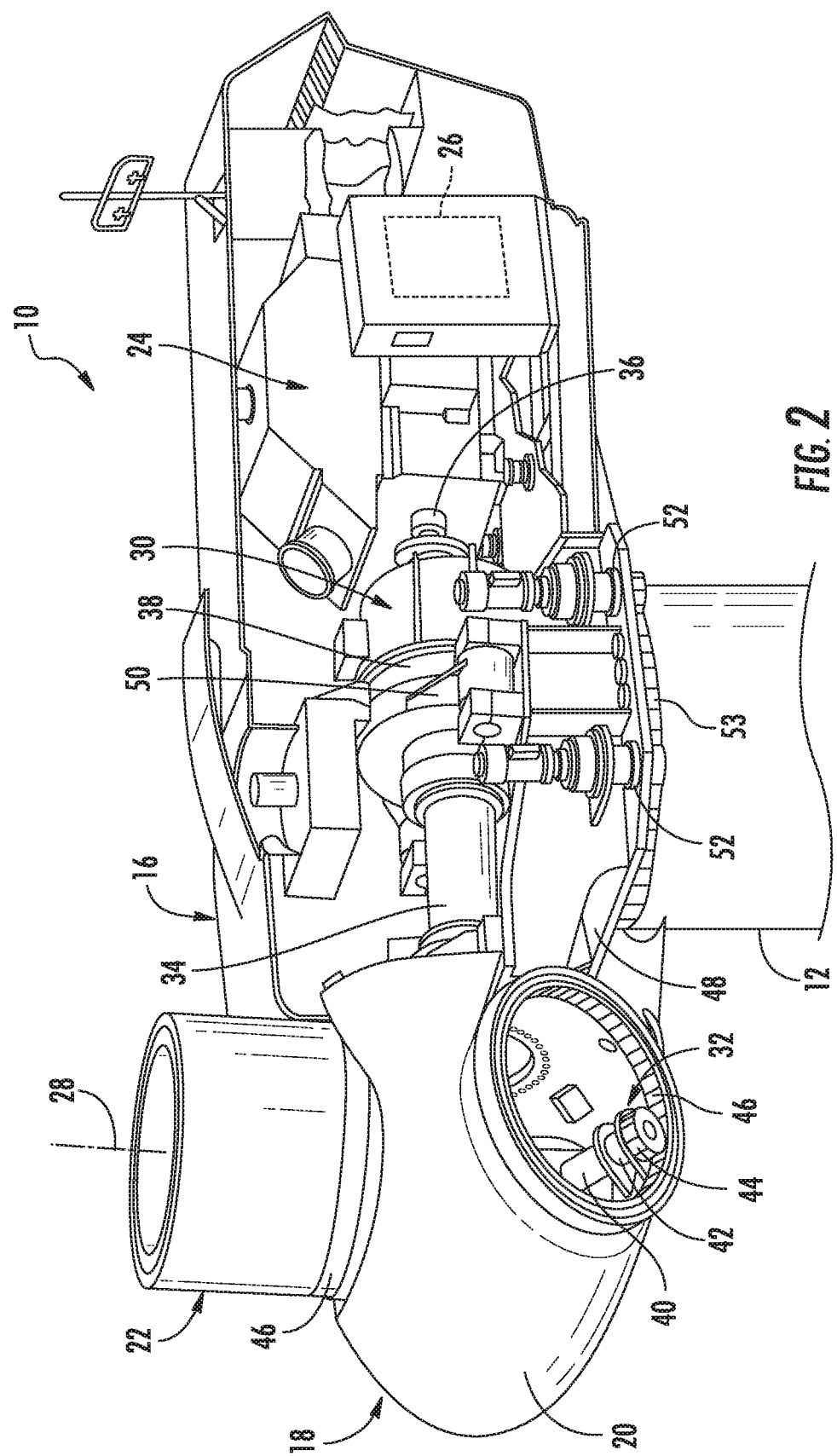
FIG. 2 illustrates a perspective view of a simplified, internal view of one embodiment of a nacelle of a wind turbine according to the present disclosure, particularly illustrating a drivetrain assembly having a single main bearing unit.
Figure 3:
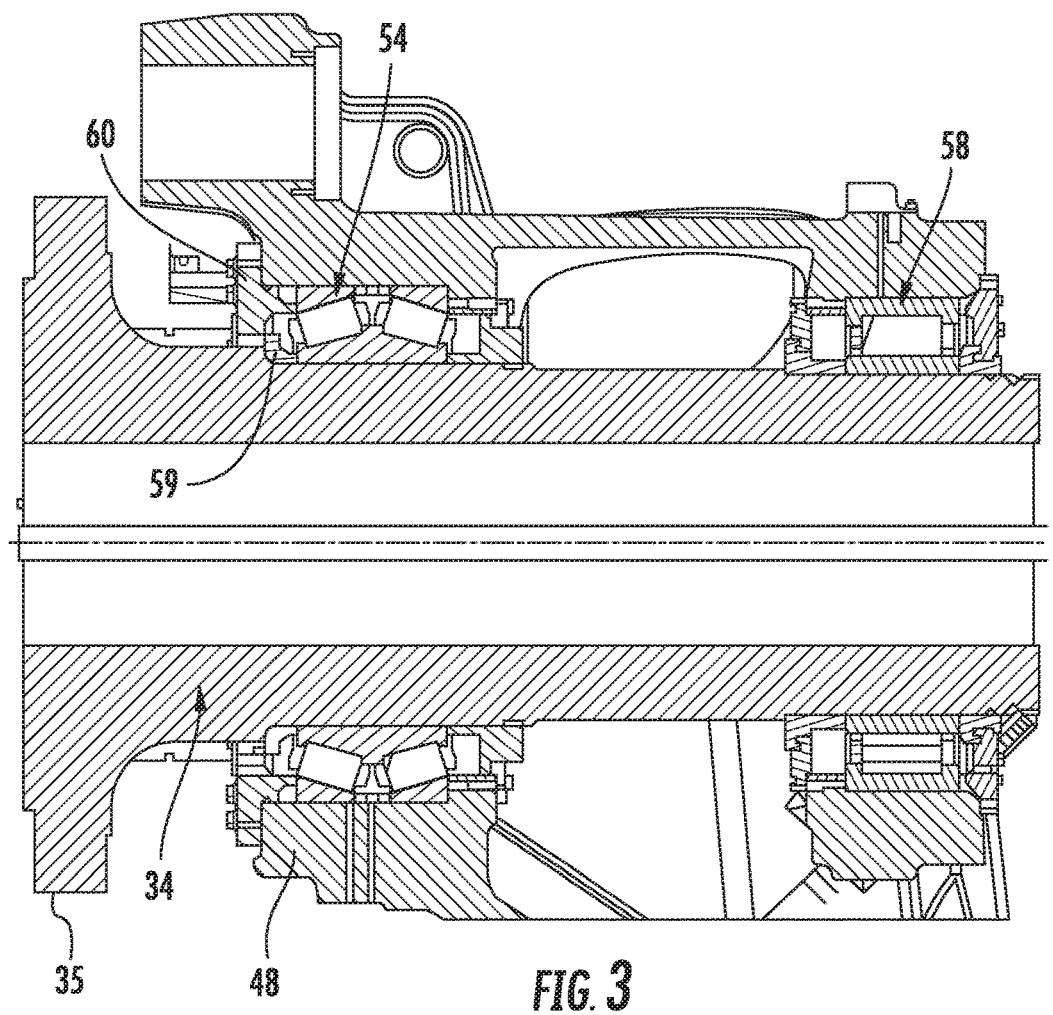
FIG. 3 illustrates a cross-sectional view of one embodiment of certain drivetrain components of a wind turbine according to the present disclosure, particularly illustrating a drivetrain assembly having a dual main bearing unit.
Figure 4:
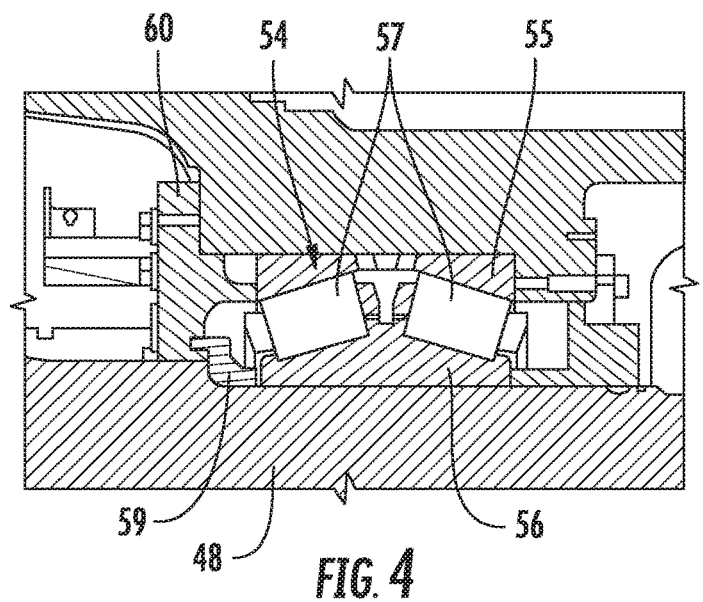
FIG. 4 illustrates a detailed cross-sectional view of the embodiment of FIG. 3.

Referring now to FIGS. 2-4, various views of the drivetrain assembly of a wind turbine, such as the wind turbine 10 of FIG. 1, are illustrated. FIG. 2 illustrates a simplified, internal view of one embodiment of the nacelle 16 of the wind turbine 10 shown in FIG. 1, particularly illustrating certain drivetrain components of a drivetrain assembly having a single main bearing unit. FIG. 3 illustrates a cross-sectional view of one embodiment of several drivetrain components of a dual-bearing drivetrain assembly of the wind turbine 10 according to the present disclosure. FIG. 4 illustrates a detailed cross-sectional view of the embodiment of FIG. 3. As shown in FIG. 2, the generator 24 may be coupled to the rotor 18 for producing electrical power from the rotational energy generated by the rotor 18. Further, as shown in FIGS. 2 and 3, the rotor 18 may include a main shaft 34 having a main flange 35 rotatable via a main bearing 54 coupled to the hub 20 for rotation therewith. The main shaft 34 may, in turn, be rotatably coupled to a gearbox output shaft 36 of the generator 24 through a gearbox 30. More specifically, as shown in FIGS. 3 and 4, the main shaft 34 is typically supported by one or more bearings 54, 58. For example, as shown, a upwind end of the shaft 34 may be supported by a first or main bearing 54 and a downwind end of the shaft 34 may be supported by a second bearing 58. More specifically, as shown, the main bearing 54 generally corresponds to a tapered roller bearing having an inner race 56, an outer race 55, and a plurality of roller elements 57 arranged therebetween. In further embodiments, the main bearing 54 may be any suitable bearing in addition to tapered roller bearings, including for example, a spherical roller bearing, a ball bearing, or any other suitable bearing. In addition, as shown, the main bearing 54 may be secured in place via a bearing cover 60 that is mounted at the upwind end of the shaft 34, as well as a seal ring 59 configured between the cover 60 and the main bearing 54. For example, in certain embodiments, the seal ring 59 may correspond to a labyrinth seal that prevents leakage of bearing fluids. Further, as shown, the bearings 54, 58 may be mounted to the bedplate member 48 of the nacelle 16 via one or more torque supports 50.

Referring back to FIG. 2, the gearbox 30 may include a gearbox housing 38 that is connected to the bedplate 48 by one or more torque arms 50. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 53 of the wind turbine 10).

Figure 5:
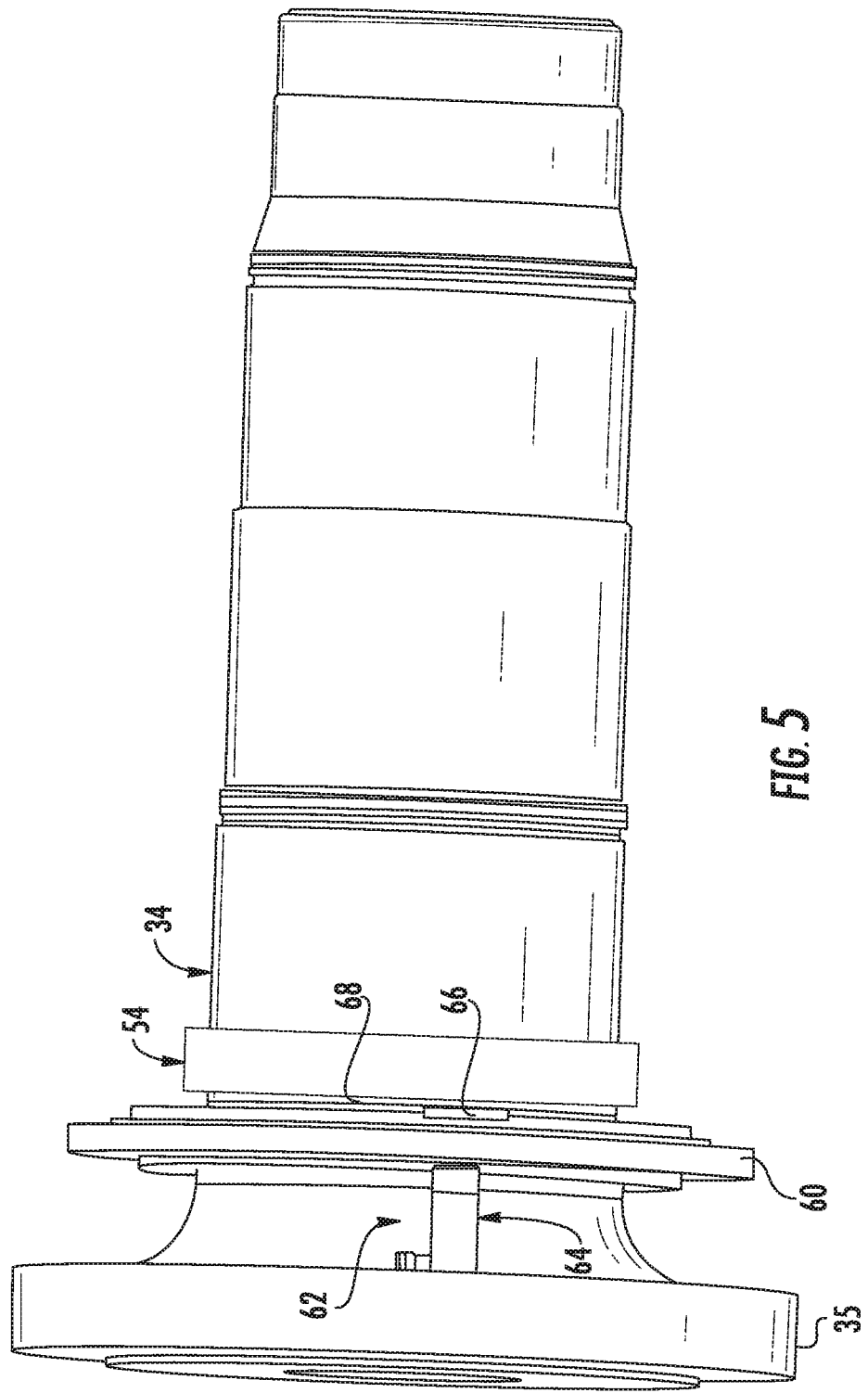
FIG. 5 illustrates a partial, cross-sectional view of the main shaft and the main bearing with the clamping apparatus installed thereon according to the present disclosure.
Figure 6:
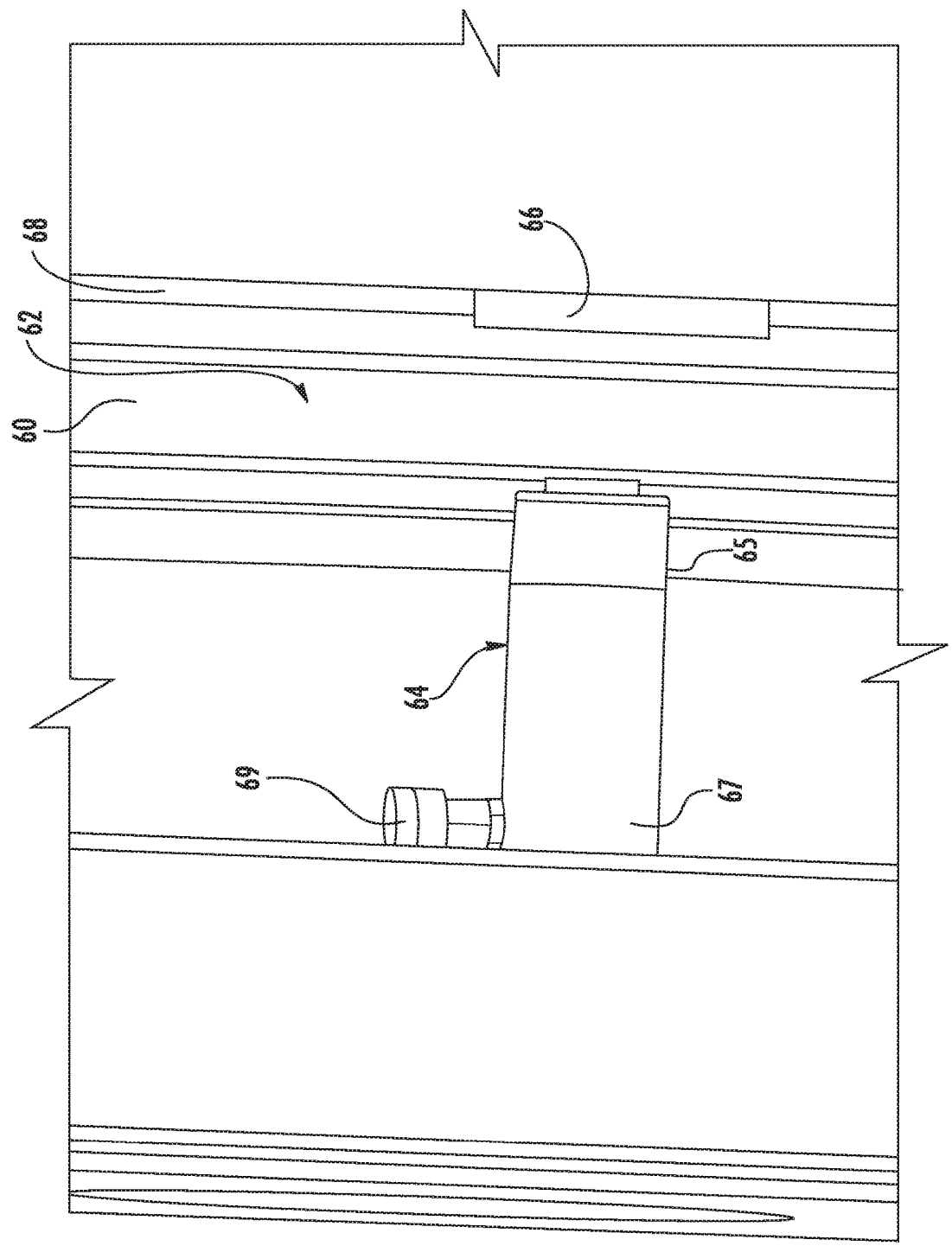
FIG. 6 illustrates a detailed view of the clamping apparatus of FIG. 5.
Figure 7:
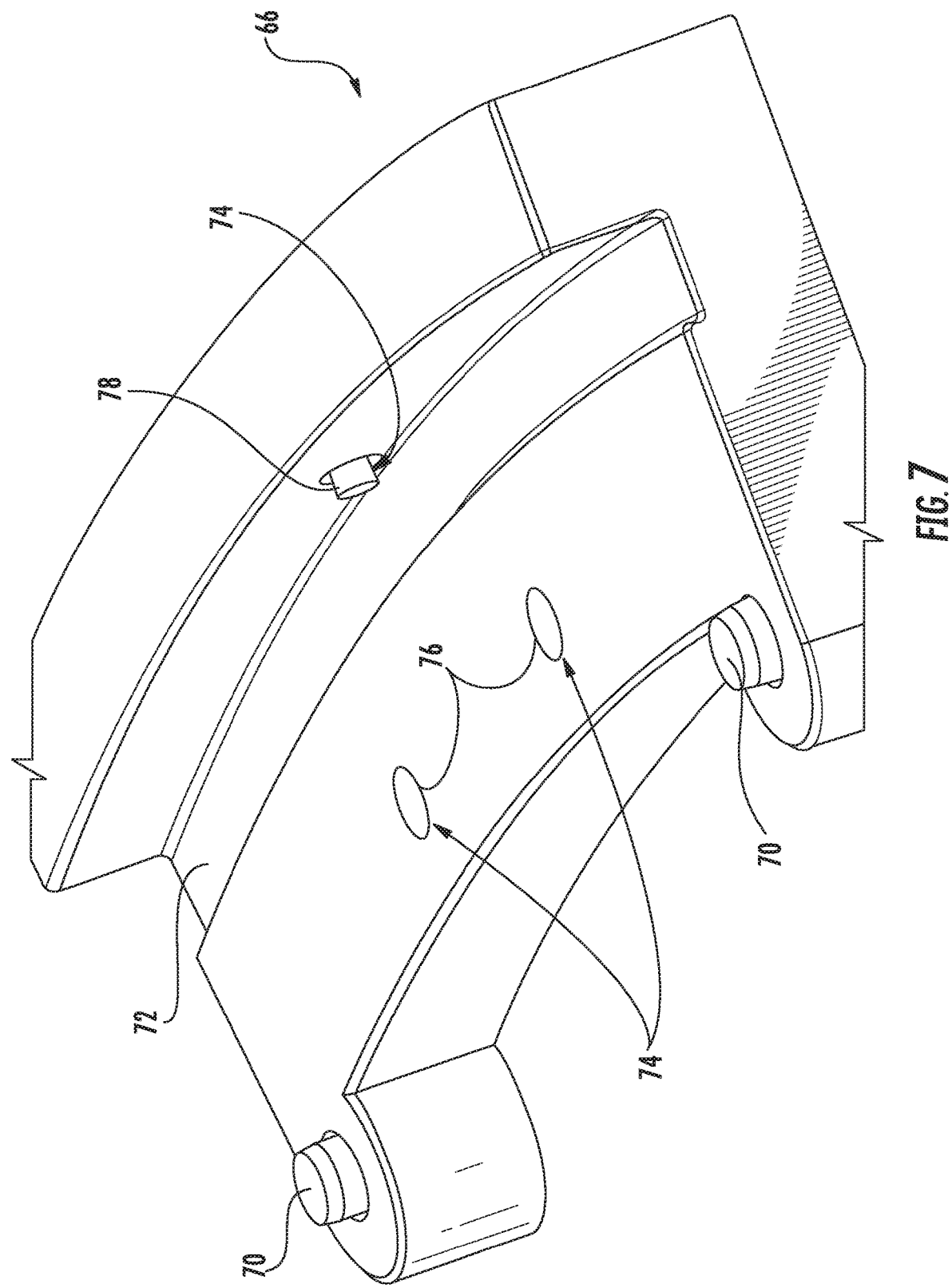
FIG. 7 illustrates a perspective view of one embodiment of the spacer plate of the clamping apparatus according to the present disclosure.

Referring now to FIGS. 5-7, various views of a clamping apparatus 62 for positioning and securing an outer race 55 of the main bearing 54 of the wind turbine 10 during installation and/or repair of the main bearing 54 are illustrated. For example, in the event that the main bearing 54 becomes damaged and needs to be replaced, the clamping apparatus 62 may be used to secure and position a new main bearing 54 after the new bearing 54 is mounted around the main shaft 34. More specifically, FIG. 5 illustrates a partial, cross-sectional view of the main shaft 34 and the outer race 55 of the main bearing 54 with the clamping apparatus 62 installed thereon according to the present disclosure. FIG. 6 illustrates a detailed view of the clamping apparatus 62 of FIG. 5. FIG. 7 illustrates a perspective view of one embodiment of the spacer plate 66 of the clamping apparatus 62 according to the present disclosure.

More specifically, as shown, the clamping apparatus 62 includes a push component 64 positioned between the main flange 35 and the cover 60 of the main bearing 54. Further, as shown, the clamping apparatus 62 includes a spacer plate 66 positioned within a gap 68 between the cover 60 and the main bearing 54. As such, the push component 64 is configured to apply a force to the cover 60 so as to push the spacer plate 66 against the outer race 55 of the main bearing 54 such that the main bearing 54 is pushed into and secured in place during installation and/or repair thereof.

As shown particularly in FIGS. 5 and 6, the push component 64 includes a push member 65 at least partially enclosed within a housing 67. Further, in certain embodiments, the push member 65 may include a piston, a jacking fastener or screw, or any other suitable push member capable of applying the desired force to the cover of the main bearing 54. For example, as shown in the illustrated embodiment, the push member 65 corresponds to a hydraulic piston driven by a hydraulic system 69. In addition to hydraulics, the push member 65 may also be driven by any suitable type of motor, pump, electrical power, and/or batteries or combinations thereof.

Referring now to FIG. 7, the spacer plate 66 may include one or more locating features 70 for locating the spacer plate 66 within the gap 68. For example, as shown, the locating features 70 are dowel pins. In additional embodiments, the locating features 70 may correspond to fasteners, studs, or similar. In addition, as shown, the spacer plate 66 may include an arcuate shape corresponding to a profile of the outer race 55 of the main bearing 54. As such, the curvature of the spacer plate 66 may generally align with the curvature of the main bearing 54.

In addition, as shown, the spacer plate 66 may include a recess 72 configured to receive a portion of the cover 60 of the main bearing 54 when secured within the gap 68. In another embodiment, the spacer plate 66 further may include one or more securing features 74 for securing the spacer plate 66 within the gap 68. More specifically, in certain embodiments, the securing feature(s) 74 may include one or more magnets 76, one or more set screws 78, or similar, and/or combinations thereof. In addition, as shown, the securing feature(s) 74 may be located at any suitable location on the spacer plate 66. For example, as shown, a set screw 78 is located within the recess 72 so as to secure the spacer plate 66 to the cover 60 of the main bearing. Further, as shown, a plurality of magnets 76 are located on an exterior surface of the spacer plate 66 so as to further secure the plate 66 to the cover 60.

Figure 8:
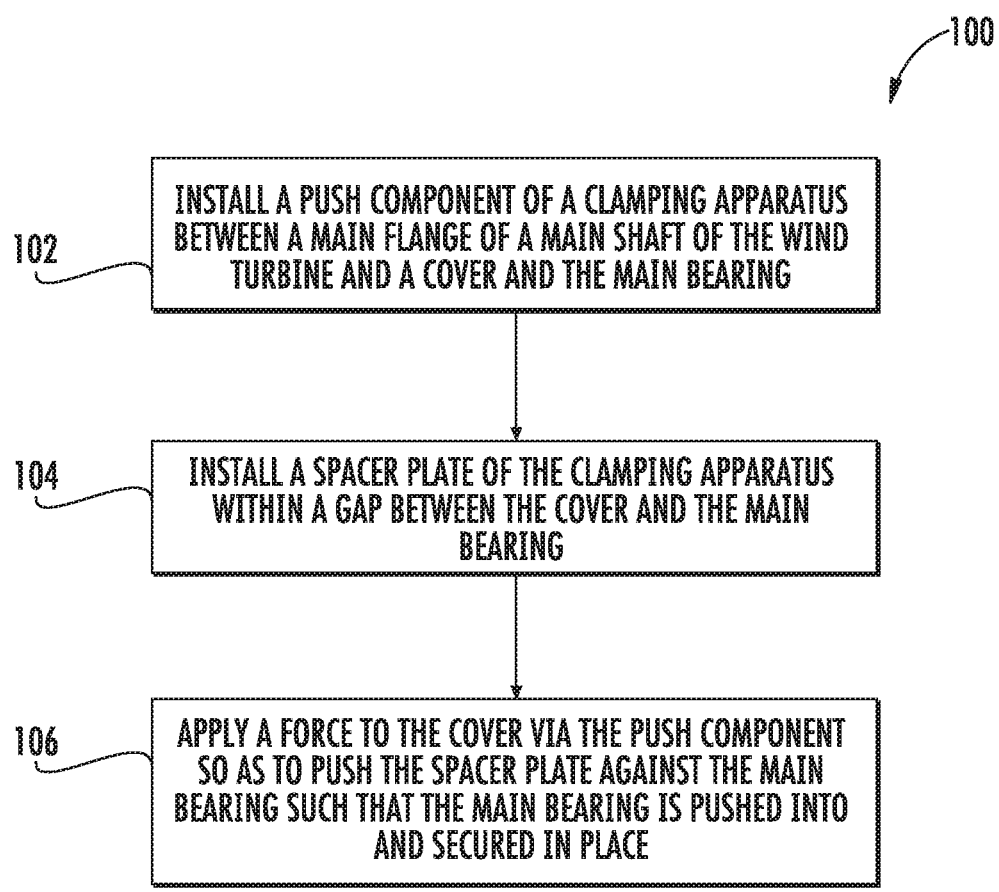
FIG. 8 illustrates a flow diagram of one embodiment of a method for positioning and securing the main bearing of the wind turbine during installation and/or repair thereof.

Referring now to FIG. 8, a flow diagram of one embodiment of a method 100 for securing the main bearing 54 of the wind turbine 10 during installation and/or repair thereof is illustrated. As shown at 102, the method 100 includes installing the push component 64 of the clamping apparatus 62 between the main flange 35 of the main shaft 34 and the cover 60 of the main bearing 54. As shown at 104, the method 100 includes installing the spacer plate 66 of the clamping apparatus 64 within a gap 68 between the cover 60 and an outer race 55 of the main bearing 54. As shown at 106, the method 100 applying a force to the cover 60 via the push component 64 so as to push the spacer plate 66 against the outer race 55 of the main bearing 54 such that the main bearing 54 is pushed into and secured in place.

In one embodiment, the method 100 may also include locating the spacer plate 66 via one or more locating features 70 (e.g. dowel pins) mounted thereon. For example, in certain embodiments, the locating features 70 may be configured to fit within an existing location on the cover 60. Alternatively, one or more locations on the cover 60 can be prepped to receive the locating features 70.

In another embodiment, the method 100 may include securing a portion of the cover 60 of the main bearing 54 in the recess 72 of the spacer plate 66 (FIG. 7). In addition, as mentioned, the method 100 may include securing the spacer plate 66 within the gap 68 between the cover 60 and the outer race 55 of the main bearing 54 via the securing feature(s) 74.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for positioning a main bearing of a wind turbine during an installation and/or repair procedure, the system comprising:
    a wind turbine comprising a main shaft with a main bearing mounted thereto, the main bearing comprising a cover, the main shaft comprising a main flange, the cover and the main bearing having a gap defined therebetween, the cover comprising a rotor-side surface and a generator-side surface;
    a clamping apparatus comprising a push component arranged between the main flange of the main shaft and the cover of the main bearing and a spacer plate positioned between the generator-side surface of the cover and the main bearing, the push component and the spacer plate being aligned along a longitudinal axis of the main shaft;
    wherein the push component applies a force to the rotor-side surface of the cover so as to push the spacer plate against an outer race of the main bearing such that the main bearing is pushed into and secured in place during an installation and/or repair procedure.

2. The system of claim 1, wherein the push component comprises a push member at least partially enclosed within a housing, the push member comprising at least one of a piston or jacking fastener.

3. The system of claim 1, wherein the spacer plate further comprises one or more locating features for locating the spacer plate within the gap.

4. The system of claim 3, wherein the one or more locating features comprise dowel pins, fasteners, or studs.

5. The system of claim 1, wherein the spacer plate comprises an arcuate shape corresponding to a profile of the main bearing.

6. The system of claim 1, wherein the spacer plate comprises a recess configured to receive a portion of the cover of the main bearing.

7. The system of claim 6, wherein the spacer plate further comprises one or more securing features for securing the spacer plate within the gap.

8. The system of claim 7, wherein the one or more securing features comprise at least one of one or more magnets or one or more set screws.

9. The system of claim 7, wherein the one or more securing features are arranged within the recess so as to secure the spacer plate to the cover of the main bearing.

10. The system of claim 1, wherein the main bearing comprises at least one of a tapered roller bearing, a spherical roller bearing, or a ball bearing.

11. A method for positioning a main bearing of a wind turbine during an installation and/or repair procedure, the method comprising:
    installing a push component of a clamping apparatus between a main flange of a main shaft of the wind turbine and a cover of the main bearing, the cover and the main bearing having a gap defined therebetween, the cover comprising a rotor-side surface and a generator-side surface;
    installing a spacer plate of the clamping apparatus between the generator-side surface of the cover and the main bearing; and
    applying a force to the rotor-side surface of the cover via the push component so as to push the spacer plate against the main bearing such that the main bearing is pushed into and secured in place.

12. The method of claim 11, wherein the push component comprises a push member at least partially enclosed within a housing, the push member comprising at least one of a piston or jacking fastener.

13. The method of claim 11, further comprising locating the spacer plate via one or more locating features mounted thereon.

14. The method of claim 13, wherein the one or more locating features comprise dowel pins, fasteners, studs.

15. The method of claim 11, further comprising securing a portion of the cover of the main bearing in a recess of the spacer plate.

16. The method of claim 15, further comprising securing the spacer plate within the gap between the cover and the main bearing via one or more securing features.

17. The method of claim 16, wherein the one or more securing features comprise at least one of one or more magnets or one or more set screws.

18. The method of claim 16, wherein the one or more securing features are arranged within the recess so as to secure the spacer plate to the cover of the main bearing.

19. The method of claim 11, wherein the main bearing comprises at least one of a tapered roller bearing, a spherical roller bearing, or a ball bearing.

* * * * *